(12) United States Patent
Cullen et al.

(10) Patent No.: US 7,215,054 B2
(45) Date of Patent: May 8, 2007

(54) MAGNETIC BEARING

(75) Inventors: John James Anthony Cullen, Derby (GB); Cerith Davies, Derby (GB); John Richard Webster, Derby (GB)

(73) Assignee: Rolls-Royce plc, London (GB)

( * ) Notice: Subject to any disclaimer, the term of this patent is extended or adjusted under 35 U.S.C. 154(b) by 0 days.

(21) Appl. No.: 11/529,505

(22) Filed: Sep. 29, 2006

(65) Prior Publication Data

US 2007/0018518 A1    Jan. 25, 2007

Related U.S. Application Data

(62) Division of application No. 11/088,972, filed on Mar. 24, 2005, now Pat. No. 7,138,739.

(30) Foreign Application Priority Data

May 6, 2004    (GB) ................... 0410168.9

(51) Int. Cl.
*H02K 7/09*    (2006.01)
(52) U.S. Cl. ..................................... 310/90.5
(58) Field of Classification Search ............... 310/90.5; 318/287, 434, 727
See application file for complete search history.

(56) References Cited

U.S. PATENT DOCUMENTS

| | | | |
|---|---|---|---|
| 5,144,215 A * | 9/1992 | Bahn ............................ | 318/701 |
| 5,262,692 A | 11/1993 | Williams et al. | |
| 5,313,149 A | 5/1994 | Bahn | |
| 5,528,445 A * | 6/1996 | Cooke et al. .................. | 361/20 |
| 5,574,345 A | 11/1996 | Yoneta et al. | |
| 5,574,346 A * | 11/1996 | Chavan et al. ............... | 318/434 |
| 5,990,590 A | 11/1999 | Roesel et al. | |
| 6,949,853 B2 | 9/2005 | Kawashima | |
| 2003/0187321 A1 | 10/2003 | Hoffman et al. | |
| 2004/0022653 A1 | 2/2004 | Brunet et al. | |

FOREIGN PATENT DOCUMENTS

| | | |
|---|---|---|
| EP | 1 460 293 A2 | 9/2004 |
| GB | 1 228 004 | 4/1971 |
| GB | 2 303 412 A | 2/1997 |
| JP | A-05-312214 | 11/1993 |

* cited by examiner

*Primary Examiner*—Thanh Lam
(74) *Attorney, Agent, or Firm*—Oliff & Berridge, PLC

(57) ABSTRACT

With an active magnetic bearing 1 there is a limit to the available rapidity of response to transient loadings upon a target or rotor 4. Thus, in accordance with the present invention, storage devices 25, 125, 225, 35 hold an electrical voltage VS significantly greater than the normal supply voltage V provided by a normal electrical source 22, 32. In such circumstances when a very large transient loading is detected on the bearing 1 a switch 26, 37 discharges the supply voltage VS across the coil 23, 33 in order that a more rapid increase and higher value inductance current IT is presented to the coil 22, 32 in response to that variable loading upon the target/rotor 24, 34. The electrical discharge from the storage device 25, 125, 225, 35 can be adjusted using the switch 26, 37 or mixing the storage devices 25, 125, 225, 35 as required for an appropriate discharge signal shape. Generally, the active magnetic bearing 21, 31 is controlled by a controller device which monitors target/rotor 24, 34 position in order to determine transient loading and therefore switching of the storage device 25, 125, 225, 35.

1 Claim, 2 Drawing Sheets

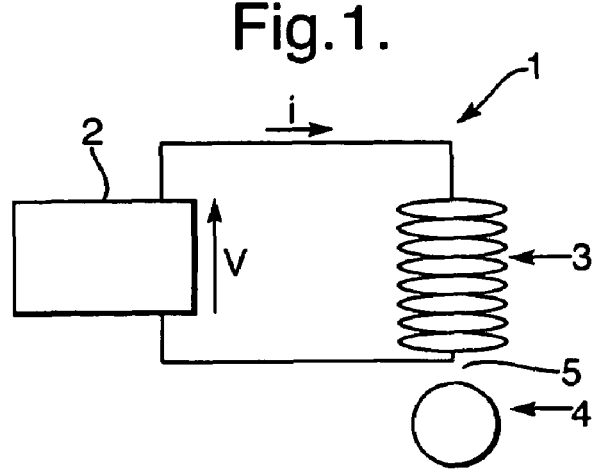
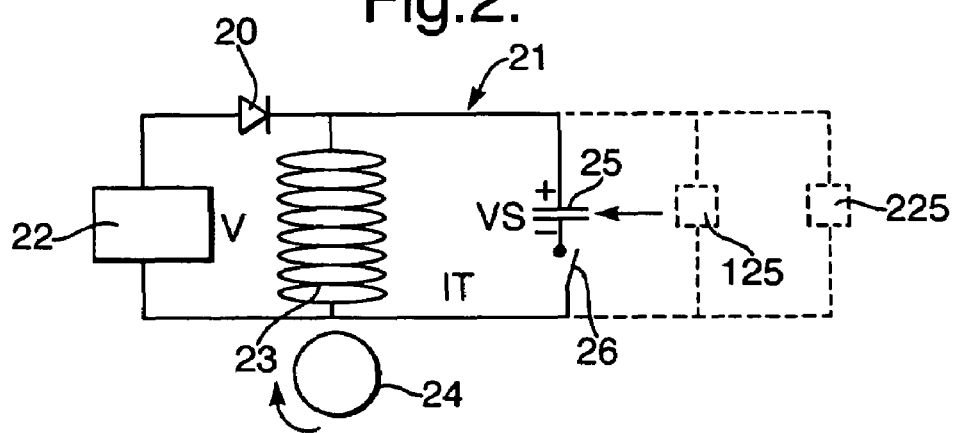
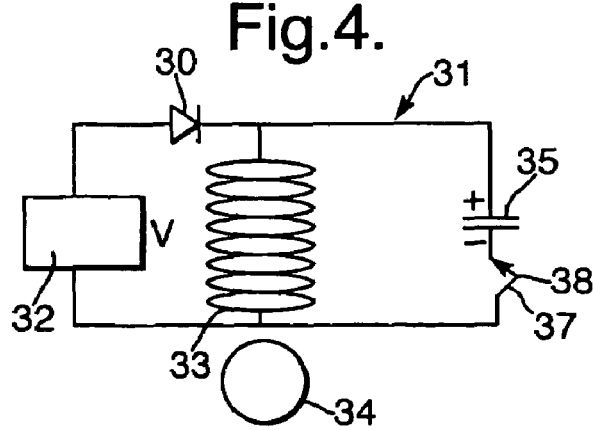

MAGNETIC BEARING

This is a Division of application Ser. No. 11/088,972 filed Mar. 24, 2005 now U.S. Pat. No. 7,138,739. The entire disclosure of the prior application is hereby incorporated by reference herein in its entirety.

The present invention relates to magnetic bearings and more particularly to active controlled magnetic bearings subject to variable loading.

Active magnetic bearings (AMB) typically comprise electrical coils of inductance L, a power supply of maximum voltage V, position sensors, a controller and a target or rotor supported by the bearing whose position is controlled. In short, through creation of a magnetic field, the target or rotor is magnetically supported by the magnetic field which in turn is created by the electrical inductance coils. Clearly, the load applied by the target or rotor is variable dependent upon operational status. In such circumstances the active magnetic bearing must respond to the variable load in order to support the target or rotor.

The rate at which an active magnetic bearing can respond to a transient variation in load is determined by the rate at which electrical current i in the inductance coils can change with time. With prior active magnetic bearings this rate of change with time is limited by the available power supply voltage V and electrical coil inductance L in a relationship $di/dt$ less than or equal to $V/L$. Nevertheless, it will be appreciated that these transients are relatively shortlived and therefore effective overrating of the power supply voltage V may lead to a cumbersome system.

In accordance with the present invention there is provided a magnetic bearing subject to variable load, the magnetic bearing comprising an inductance coil, an electrical power supply arranged to supply an electrical current to the inductance coil during normal loads, a storage device arranged to supply additional electrical current to the inductance coil during a load transient, and the storage device having an electrical storage voltage significantly greater than the electrical supply voltage of the electrical power supply.

Preferably a diode is provided between the inductance coil and the electrical power supply to prevent reverse current in the electrical power supply.

Preferably, the storage device is an electrical capacitor. The storage device may be a battery, a fuel cell, a dc generator with fly wheel, or other suitable device.

Conveniently, a control switch is provided in order that, at appropriate times, the storage device is coupled to the inductance coil. Possibly, that control switch comprises a transistor or other electrical device or an optoelectrical device.

Possibly, more than one storage device is provided. Typically, these storage devices allow for successive supplying of electrical current to the inductance coil within the regenerative time lag of the storage devices. Possibly, the storage devices allow for successive supplying of electrical current over a period of time to the inductance coil. Alternatively, the storage devices may allow through an appropriate switching regime for differing electrical storage voltage response dependent upon transient loading.

Embodiments of the present invention will now be described by way of example only with reference to the accompanying drawings in which;

FIG. 1 is a schematic illustration of a typical active magnetic bearing;

FIG. 2 is a schematic illustration of an active magnetic bearing in accordance with a first embodiment of the present invention; and, FIG. 3 is a graph showing electrical current through an inductance coil of the active magnetic bearing against time.

FIG. 4 is a schematic illustration of an active magnetic bearing in accordance with a second embodiment of the present invention.

Figure 3:
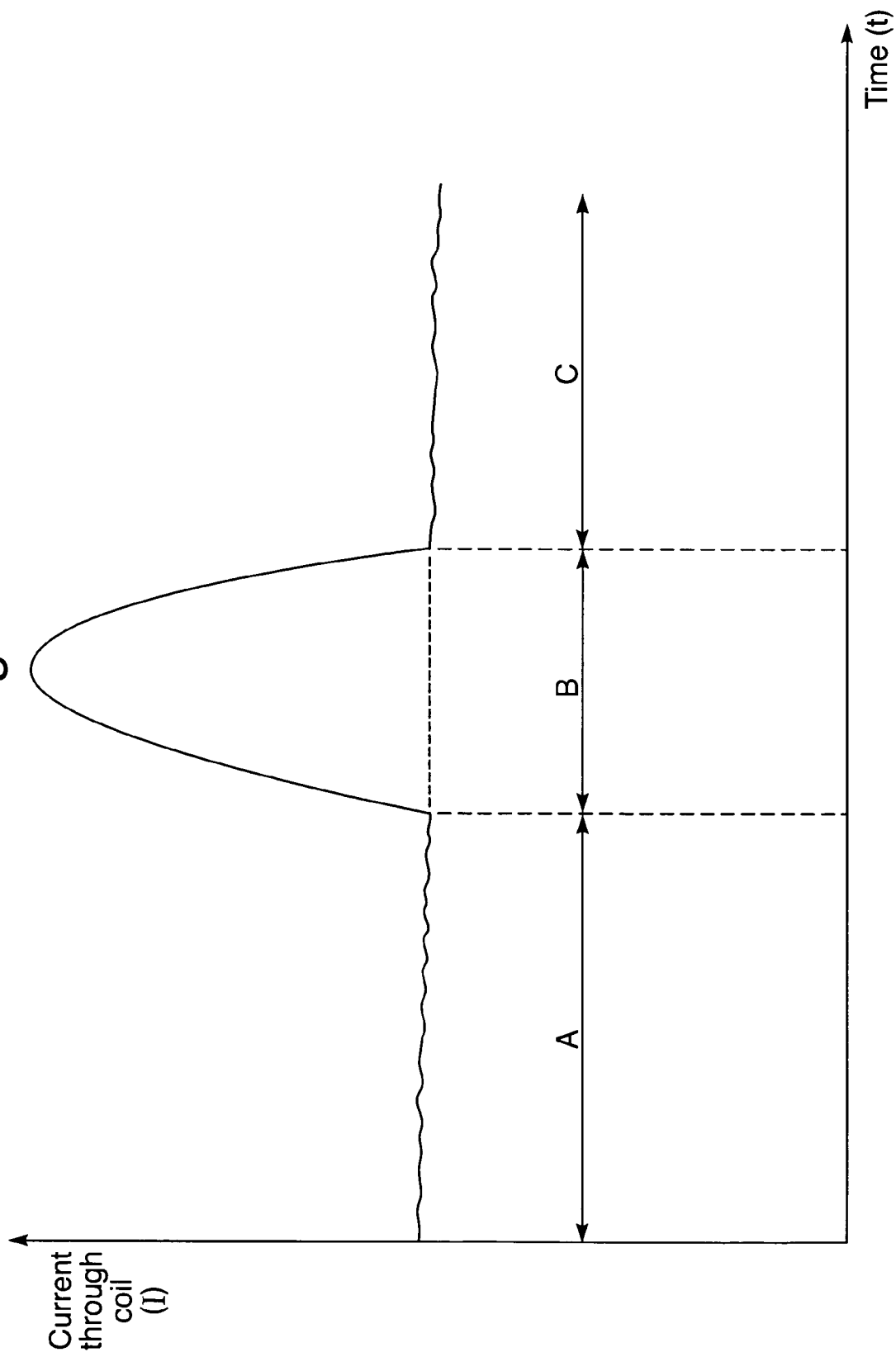

FIG. 1 provides a schematic illustration of a typical active magnetic bearing. Thus, an electrical power supply 2 has a voltage V in order to supply a current i to a coil 3 such that through the magnetic field a target or rotor 4 is suspended with an air gap 5 between the coil and target/rotor 4. In such circumstances the target or rotor 4 can be subject to varying loads as required with the target/rotor 4 suspended by the magnetic field of the coil 3. It will be understood normally a number of coils will be provided in order to support the target/rotor 4.

Clearly, in a normal operational situation the target/rotor 4 may be subject to differing loads or transient variations in load. In such circumstances the active magnetic bearing 1 will incorporate position sensors and a controller in order to determine variations in rotor position and in the air gap 5 such that an active response to such variations can be made. The rate at which the active magnetic bearing 1 can respond to a transient is determined, as indicated above, by the rate at which the current in the coils 3 can change with time, that is to say $di/dt$. In the typical active magnetic bearing schematically depicted in FIG. 1, it will be noted that this rate of change of current with time is limited by the voltage V of the normal electrical power supply 2 such that $di/dt$ is less than or equal to voltage (V) divided by inductance (L).

In accordance with the present invention, a short term storage device such as an electrical capacitor or flywheel storage device in a dc generator is provided to supply additional electrical power capacity during a target or shaft load transient. Thus, in FIG. 2, a normal electrical power supply 22 provides a supply voltage V to a coil 23 in order to constitute an active magnetic bearing relative to a target or rotor 24. A diode 20 is provided in the normal supply circuit from the electrical power supply 22 to the coil 23. In accordance with the present invention, a storage device 25 is provided with a switch 26 such that when a transient load variation occurs the switch 26 can be closed in order that a storage electric voltage VS is temporarily presented across the coil 23 whereby the transient current IT rises more quickly and is ultimately significantly greater and therefore capable of providing more robust support during the transient period. The diode 20 acts to ensure that the supply voltage VS is essentially presented across the coil 23 with the diode 20 therefore acting to prevent reverse current in the electrical power supply 22.

The electrical current through the coil 23 immediately before, during and after a transient load variation is shown in FIG. 3. Over time period A the electrical power supply 23 supplies a steady state current through the coil 23. During time period B the storage device 25 supplies a transient current through the coil 23 and then over time period C the electrical power supply 22 supplies a steady state current through the coil 23. A load transient occurs during time period B.

As depicted, the storage device 25 is typically an electric capacitor. This capacitor is charged to a voltage VS which is significantly greater than the normal power supply voltage V. In such circumstances as described, when a rapid transient change in the active magnetic bearing load occurs, the capacitor is discharged through the coil 23 to give a rapid change in the electrical current of the coil 23. Clearly, some means (not shown) is required for determining that load transient. This means will typically take the form of positional sensors and a controller determining eccentricity of the target or rotor 24 indicative of load variation.

Generally, within the electrical and heat capacity of the coil 23, the storage voltage VS in the storage device 25 can be many multiples of the normal supply voltage V in order to provide adequate capacity and to accommodate for the load transients described. Thus, VS may be orders of magnitude larger than V but will more typically be up to 10 times the normal supply voltage V.

By implication the storage device 25 in accordance with the present invention will be itself relatively short term rated to accommodate transient load variations, otherwise it would be more convenient simply to provide a broader normal supply voltage V range to accommodate such variations. In such circumstances there will generally be a regenerative time for the storage device 25 during which it will not be possible to fully provide the transient storage voltage VS and therefore current IT from a fully or partially discharged storage device 25. The regenerative time lag, or regenerative time, is the time taken for a storage device 25 to recharge. There may be more than one transient load. This potential disadvantage may be overcome by providing a number of storage devices and as indicated in FIG. 2 by broken lines 125, 225 which can be appropriately controlled, switched and discharged as required in order to provide the transient current necessary for transient loading on the target or rotor 24. These additional storage devices 125, 225 may also be electrical capacitors or, as with the primary storage device 25, a battery or dc generator with a fly wheel storage device. In such circumstances, a large transient current IT can be maintained across the coil 23 for a more sustained period of time for a more long term transient loading on the target or rotor 24. It will also be understood by mixing different types of storage device, that is to say combinations of electrical capacitor, batteries and dc generators, it may be possible to achieve different speeds of transient response depending upon the detected transient loading placed upon the active magnetic bearing 21. Nevertheless, it is more rapid response which is a core desirable feature of the present invention, and as indicated previously this will depend upon the high value of the storage voltage VS in order to induce the significant transient current IT quickly to meet the transient loading on the active magnetic bearing 21.

The storage devices 25, eg the electrical capacitors, are recharged to high voltages VS so that they are ready to be discharged again when there is another transient load. The storage devices 25, eg the electrical capacitors are charged by any suitable means and for example are supplied/charged by the electrical power supply 22 using a trickle charger using a voltage multiplier circuit. The storage device 25 is a small high voltage electrical power supply with a small amount of electrical energy.

The present invention allows a larger storage voltage VS to be applied to the coil 23 than was possible with prior art arrangements of active magnetic bearings 1 described with respect to FIG. 1. In such circumstances the transient current IT can be changed more rapidly with a consequently more rapid transient response within the active magnetic bearing 21 than also possible previously.

As indicated above, the electrical discharge response from the storage device 25 can be important in terms of achieving the desired rapidity of response to transient loadings in the bearing 21. As illustrated in FIG. 4, use of a transistor 37 or other type of electrical or optoelectrical device as the switch for a storage device 35 allows shaping of the inductance current to a coil 33 to achieve the most desirable active magnetic bearing 31 performance. As previously the coil 33 acts relative to a target or rotor 34 normally utilising a supply voltage V from an electrical power supply 32. A diode 30 acts to prevent reverse current flow in the supply 32 whereby electrical discharge from the storage device 35 is presented across the coil 33 as required. In such circumstances when the target or rotor 34 is subject to a transient loading, additional current can be more rapidly injected into the coil 33 from the storage device 35 under the control of the transistor 37 acting as a switch. In turn the transistor 37 is controlled by a controller device (not shown) which will monitor the positional status and any other appropriate sensed parameters in order to determine the transient loading and therefore the appropriate response in terms of the transient electric current 17. Typically, the transistor 37 will be controlled through its gate 38 voltage in turn determined by the control device.

The controller device may switch one of a number of alternative storage devices in order to present the storage voltage across the coil 33 and therefore induce a desired transient current in response to the transient load upon the bearing 31. Inherently, the switch 26 or transistor 37 must enable rapid switching for electrical discharge in accordance with the present invention across the respective coil 23, 33 whereby that coil 23, 33 can respond to the transient loading on the target/rotor 24, 34.

As described above if a more sustained transient electrical current is required from the storage means in accordance with the present invention then devices will be sequentially activated in order to present their respective storage voltage (VS) across the coils in succession. By such an approach it will be understood that high voltage spikes and therefore high inductance currents will flow through the coils, but as a result of the switches and control system there will be a relative smoothing of the sub transitions between the respective storage devices in order to sustain the higher electrical current through the coil in order to accommodate the variable loading upon the target/rotor as required. Nevertheless, it is not envisaged that the storage devices will for extended periods of time present electrical current through the coil and therefore replace the normal supply voltage V presented across the coil by the electrical power supplies 22, 32.

In addition to use with active controlled magnetic bearings it will be understood that the present invention could also be used with respect to permanent magnet electrical machines where it is desired, such as in aircraft engines, to de-magnetise the magnets for safety reasons. Thus, large voltages will be applied to the permanent magnet electrical machine coils for short periods. These large voltages will induce large currents in those coils thereby de-magnetising the magnets, provided a control system is provided and tuned such that the peak currents occur when the permanent magnets are adjacent to the coils. Clearly, in such circumstances the storage device in accordance with the present invention will provide the significantly greater voltages necessary to induce the large currents for de-magnetising the permanent magnets of the electric machine.

It is preferred that permanent magnets diametrically opposite each other on the rotor are demagnetised together at the same time to avoid unbalanced magnetic pull (UMP) on the rotor. Thus the electrical power supply is arranged to supply an electrical current to the coils during normal loads. The storage devices would supply additional electric current to one or more of the coils if there is a fault in one or more of the remaining coils. Faults in the coils can lead to overheating and melting of the coils. The storage device has an electrical storage voltage greater than the electrical storage voltage of the electrical power supply.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A permanent magnet electrical machine comprising a number of inductance coils, a number of magnets and an electrical power supply arranged to supply an electrical current to the inductance coils during normal loads, a storage device arranged to supply additional electrical current to one or more inductance coils if there is a fault in a further inductance coil to demagnetise the magnets, and the storage device having an electrical storage voltage significantly greater than the electrical supply voltage of the electrical power supply.

* * * * *